United States Patent Office 2,886,586
Patented May 12, 1959

2,886,586

PROCESS FOR THE PREPARATION OF PHOSPHORIC ACID TRIESTERS

Jacobus Rinse, Bernardsville, N.J., assignor to J. W. Ayers & Co., Easton, Pa., a corporation of Delaware No Drawing. Application October 22, 1954
Serial No. 464,171

11 Claims. (Cl. 260—461)

This invention relates to new and improved processes for the preparation of phosphoric esters.

Heretofore, tricresylphosphate and other phosphoric esters have been prepared customarily by treating cresol, phenol or other alcohols with phosphorus oxychloride. During the reaction hydrochloric acid is liberated and the phosphoric esters remain in the reactor. The corrosive nature of phosphorus oxychloride and hydrochloric acid, especially at the high reaction temperatures involved, necessitates the use of special alloys for the reactor and the pipelines. Yet, even with these precautions, serious corrosion problems have been encountered in operations utilizing these prior art processes.

The principal object of this invention is to provide new and improved processes which do not involve corrosion and are simple to operate. The amount of corrosion encountered in the instant process is of such low order that the process can be carried out even in mild steel apparatus.

In accordance with the process of this invention, an aluminum alcoholate, including phenolates, and phosphorus pentoxide are mixed and heated to a temperature at which the aluminum alcoholate and the phosphorus pentoxide react. The reaction may be represented as follows:

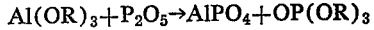

$$Al(OR)_3 + P_2O_5 \rightarrow AlPO_4 + OP(OR)_3$$

wherein OR represents the radical of the alcoholic or the phenolic compound. The phosphoric esters formed in the reaction may be readily separated from the by-product aluminum phosphate, as by extraction with liquid hydrocarbons or by distillation. No special reaction controls are required since the reactants will react merely upon being heated to reaction temperatures.

Under the preferred procedure of the invention, a mixture of the reactants is most readily obtained by melting the aluminum alcoholate and adding the phosphorus pentoxide to the molten mass. However, the reaction may be carried forward merely by mixing the reactants and heating to reaction temperatures.

In the process of this invention, the presence of phosphoric acid or traces of water will cause a decrease in the yield of the desired phosphoric esters, apparently due to side reactions and the formation of complex esters. Thus, in accordance with one embodiment of the invention the reaction takes place under substantially anhydrous conditions and in the substantial absence of phosphoric acid. Under another embodiment, the reaction is carried forward in the presence of a small quantity of an amine which suppresses the undesirable side-reactions. Various amines may be used but the preferred ones are tertiary amines, such as the aromatic tertiary amines, pyridine and quinoline.

The reactions of this invention usually proceed best at temperatures of about 250° C. and above. For example, the reaction of aluminum cresylate and phosphorus pentoxide is carried out at temperatures above 250° C., and preferably at temperatures of about 300–330° C., the reaction requiring approximately two hours.

The aluminum compounds used in the process may be prepared by any of the known processes, as for example by reacting aluminum with an aliphatic alcohol or a phenol, hydrogen being evolved. On the other hand, especially where high molecular alcoholates are to be used as reactants, they may be made by alcohol exchange of a lower aluminum alcoholate, such as isopropoxide or other lower aluminum alkoxides, with other alcoholic hydroxy compounds of a higher molecular weight, followed by the removal of the liberated lower alcohol by distillation, as disclosed in my copending application Serial Number 352,013, filed April 29, 1953.

Typical alcoholic and phenolic compounds which may be used to form the alcoholates used as reactants in this invention include normal- and iso-aliphatic alcohols of 2–18 carbon atoms, such as ethanol, pentanol, hexanol, heptanol, octanol, decanol, and the like; phenol and alkyl phenols, such as cresol and like phenolic compounds; cycloalkyl alcohols, such as cyclohexanol, decahydronaphthol, and the like.

The following examples will further illustrate the invention.

Example 1

Three hundred forty-eight grams of aluminum tricresoxide substantially free of cresol are melted and heated to 170° C. Then 142 grams of phosphorus pentoxide substantially free of phosphoric acid are introduced and the charge is heated to 320° C. for two hours. The molten mass, which is homogeneous at first, later separates and forms a solid crust of aluminum phosphate and a liquid composed of tricresyl phosphate ester which is then cooled and separated by extraction with benzene.

Example 2

Two hundred forty-six grams of aluminum butylate, 142 grams of phosphorus pentoxide and 10 grams of quinoline are heated to 250° C. for three hours until 122 grams of aluminum phosphate have separated. By vacuum distillation, 250 grams of tributylphosphate are recovered.

Example 3

Two hundred four grams of aluminum isopropylate are heated with 282 grams of phenol and, after removing 180 grams of isopropanol by distillation, 142 grams of phosphorus pentoxide are introduced. The charge is heated for two hours at 300° C. and then subjected to vacuum distillation. Approximately 300 grams of triphenylphosphate are recovered.

It should be understood that the invention is not limited to the details herein given but that it extends to all equivalents which will occur to those skilled in the art upon consideration of the claims appended hereto.

What is claimed is:

1. A process for the preparation of phosphoric triesters comprising heating a mixture of phosphorus pentoxide and an aluminum trialcoholate to a temperature at which the phosphorus pentoxide and the aluminum alcoholate react.

2. A process for the production of phosphoric triesters comprising melting an aluminum trialcoholate and phosphorus pentoxide and heating the resulting mixture to a temperature at which the aluminum trialcoholate and the phosphorus pentoxide react.

3. A process for the preparation of phosphoric triesters which comprises mixing an aluminum trialcoholate and phosphorus pentoxide and heating the reaction mixture to a temperature of at least about 250° C. but below the temperature of decomposition of the phosphoric triester formed.

4. A process for producing phosphoric tri-esters which comprises mixing an aluminum trialcoholate, phosphorus pentoxide and a tertiary amine and heating the mixture to a temperature at which the alcoholate and the phosphorus pentoxide react.

5. A process for producing a phosphoric tri-alkyl ester which comprises mixing an aluminum tri-alkoxide and phosphorus pentoxide and heating the mixture to a temperature at which the aluminum alkoxide and the phosphorus pentoxide react.

6. A process for producing a phosphoric tri-phenyl ester which comprises mixing an aluminum triphenoxide the phenyl radical of which is free of functional substituent groups phosphorus pentoxide and heating the mixture to a temperature at which the aluminum phenoxide and the phosphorus pentoxide react.

7. A process for producing a phosphoric tri-cycloalkyl ester which comprises mixing an aluminum tri-cycloalkoxide and phosphorus pentoxide and heating the mixture to a temperature at which the aluminum cycloalkoxide and the phosphorus pentoxide react.

8. A process for producing a phosphoric tri-alkphenyl ester which comprises mixing an aluminum tri-alkphenoxide the phenyl radical of which is free of functional substituent groups and phosphorus pentoxide and heating the mixture to a temperature at which the aluminum alkphenoxide and the phosphorus pentoxide react.

9. A process for producing phosphoric tri-cresyl ester which comprises mixing aluminum tricresoxide and phosphorus pentoxide and heating the mixture to a temperature at which the aluminum tricresoxide and phosphorus pentoxide react.

10. A process for producing phosphoric tri-butyl ester which comprises mixing aluminum tri-butylate and phosphorus pentoxide and heating the mixture to a temperature at which the aluminum butylate and the phosphorus pentoxide react.

11. A process for producing a phosphoric tri-phenyl ester which comprises melting an aluminum triphenoxide, the phenyl radical of which is free of functional substituent groups adding phosphorus pentoxide and heating the mixture to a temperature at which the aluminum triphenoxide and the phosphorus pentoxide react.

References Cited in the file of this patent

UNITED STATES PATENTS 1,799,349    Bannister _____ Apr. 7, 1931

OTHER REFERENCES

Kosolapoff: Organo-Phosphorus Compounds, 1950, pp. 220–222.